United States Patent [19]

Krause et al.

[11] 4,031,466

[45] June 21, 1977

[54] DIGITAL PHOTO-OPTICAL TACHOMETER

[75] Inventors: Ernest Harry Krause, Addison; Wesley Arthur Seaman, River Grove; Peter Gregory Angelopoulos, Elmhurst, all of Ill.

[73] Assignee: The Pioneer Electric and Research Corporation, Forest Park, Ill.

[22] Filed: May 5, 1975

[21] Appl. No.: 574,252

[52] U.S. Cl. .................. 324/175; 324/166; 324/83 R; 324/83 FE
[51] Int. Cl.² .................. G01P 3/36; G01R 25/00
[58] Field of Search .......... 324/166, 168, 175, 169, 324/79 R, 82, 83 R, 83 FE; 340/262

[56] References Cited
UNITED STATES PATENTS

| | | | |
|---|---|---|---|
| 3,311,755 | 3/1967 | Hebb | 307/88.5 |
| 3,441,871 | 4/1969 | Wicker | 324/82 X |
| 3,551,808 | 12/1970 | Grossimon et al. | 324/83 |
| 3,704,445 | 11/1972 | Lanham | 340/62 |
| 3,729,996 | 5/1973 | Metz | 73/194 E |
| 3,746,985 | 7/1973 | Perron | 324/166 |
| 3,811,056 | 5/1974 | Baba et al. | 307/311 |
| 3,821,896 | 7/1974 | Grob | 73/194 E |
| 3,908,167 | 9/1975 | Hulls et al. | 324/166 |

OTHER PUBLICATIONS

Digital Phase-Locked Loop, Blerkom et al., IBM Tech. Disclosure Bulletin, vol. 10, No. 3, Aug. 1967, pp. 256–257.

*Primary Examiner*—Rudolph V. Rolinec
*Assistant Examiner*—Vincent J. Sunderdick
*Attorney, Agent, or Firm*—Johnson, Dienner, Emrich & Wagner

[57] ABSTRACT

A digital tachometer having an optical sensor which provides a signal at a frequency related to the rotational or reciprocating speed of a moving object, a phase locked loop and a frequency divider circuit connected for operation as a frequency multiplier to be responsive to the sensor signal to provide a serial pulse train the period of which is an integral multiple of the sensor signal, a pulse accumulator for registering the pulses and a time rate generator which enables the pulse accumulator to register pulses for a preset duration so that the number of pulses registered is a direct representation of the revolutions per minute of the moving object.

15 Claims, 6 Drawing Figures

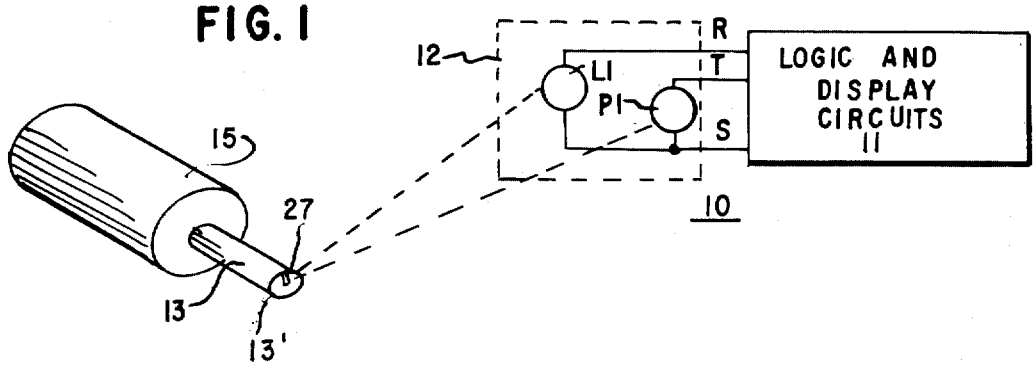
FIG. 1
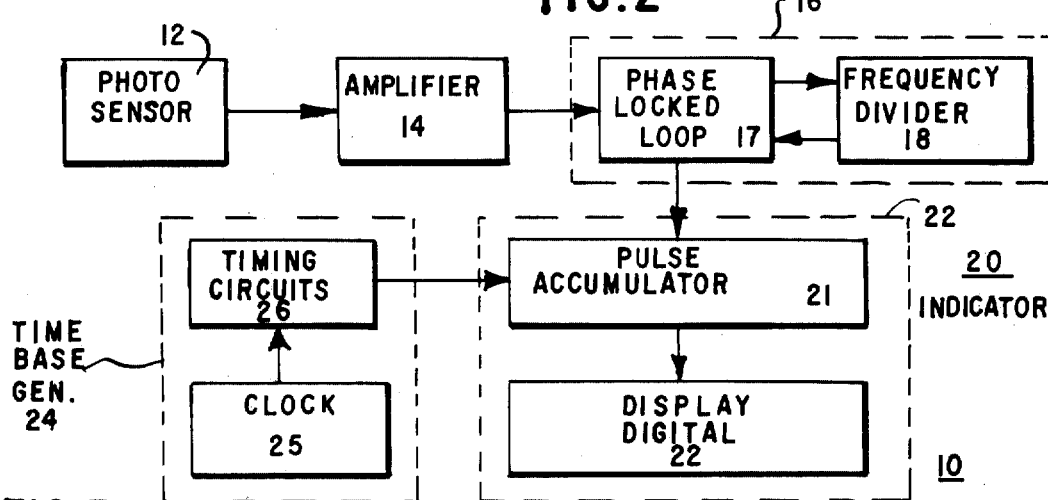
FIG. 2
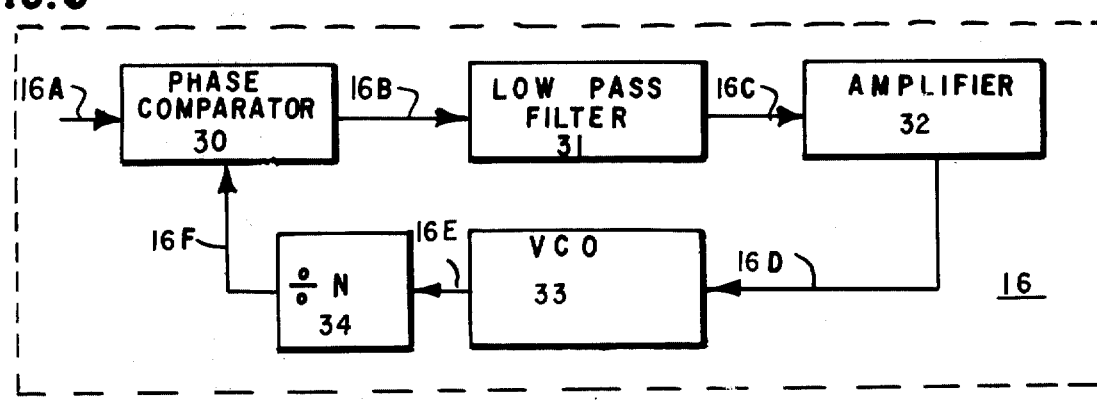
FIG. 3
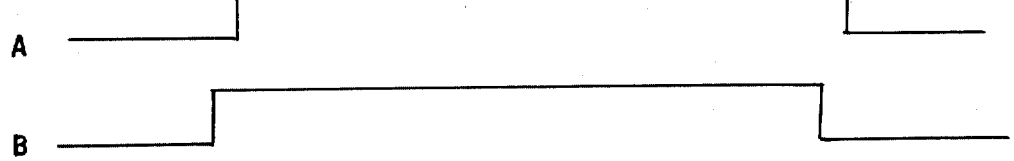
FIG. 6

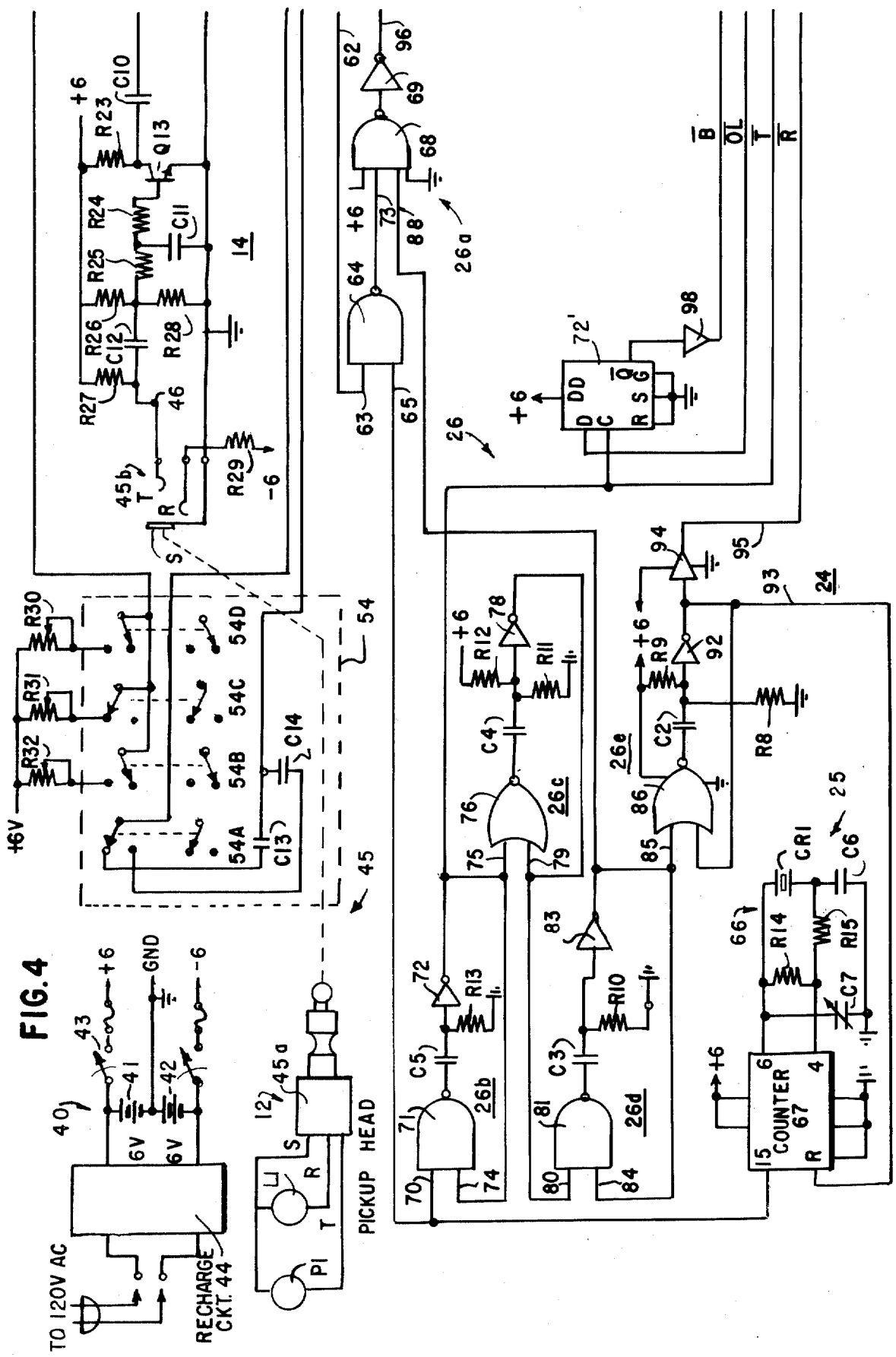

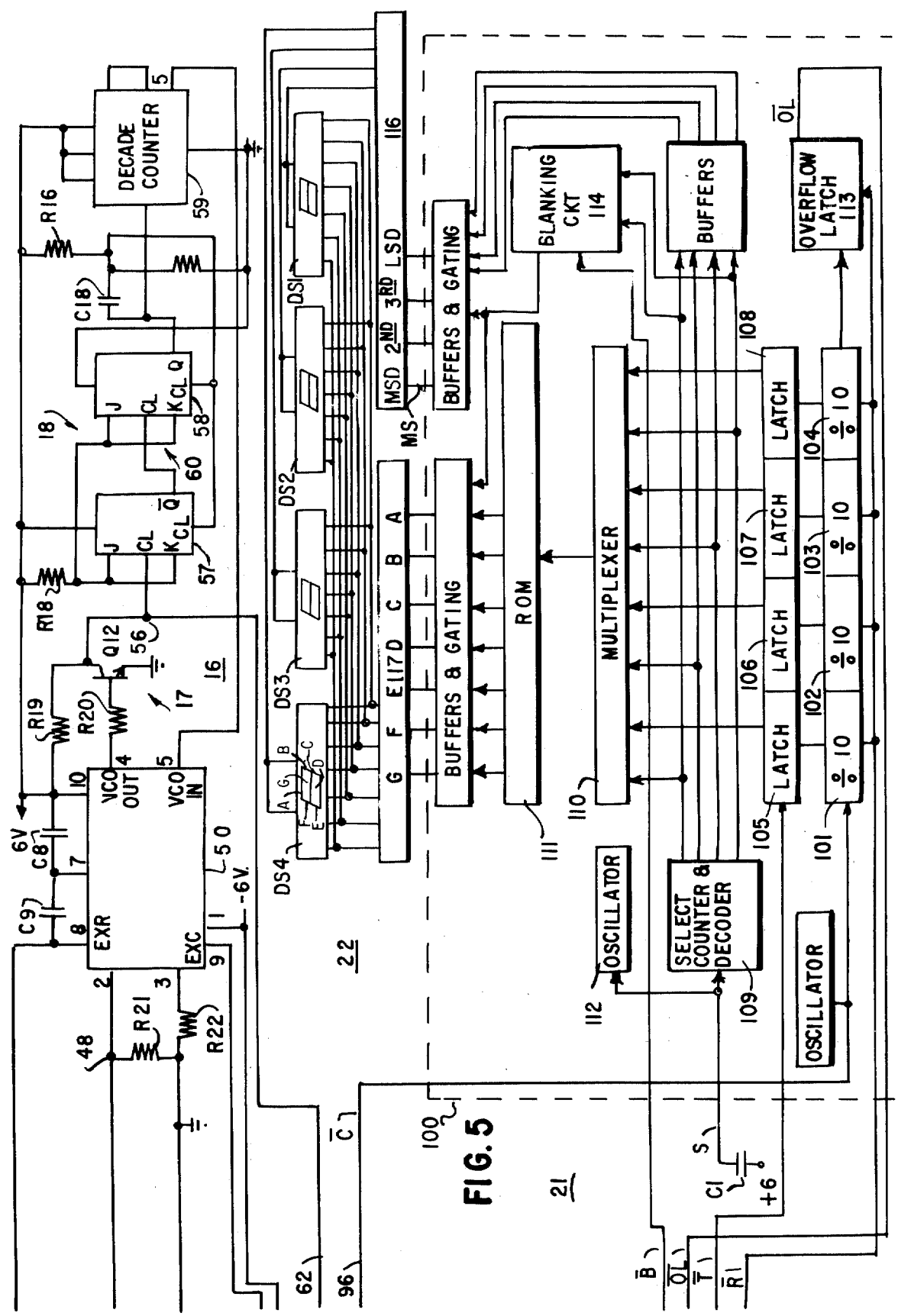

DIGITAL PHOTO-OPTICAL TACHOMETER

BACKGROUND OF THE INVENTION

1. Field of the Invention

This invention relates to tachometers and more particularly to a digital tachometer including a photo-optical sensor for measuring the speed of a rotating or reciprocating object.

2. Description of the Prior Art

In many phases of industrial and commercial operations, it is frequently necessary to measure the rotational speed of machinery. Such measurement may be accomplished in a number of ways, depending upon the nature of the object to be measured. For example, a contact-type rotational speed measuring device, employing a revolution counter may be used, with the operator observing the number of revolutions of the rotating object occuring in a given interval of time and computing the rate per minute. Several types of hand held, contacting type rotational speed measuring devices are also available which enable direct reading of the speed of a rotating object without the need for making calculations.

One disadvantage of contact-type measuring instruments is that certain rotating mechanisms do not have an accessible contact point to which the measuring device can be attached, or even though the device may have a contact point available, the contact point may be nearly inaccessible. Moreover, the need to attach the sensing mechanism of the measuring apparatus directly to the rotating object creates an additional frictional force which is imposed on the rotating object, thereby hindering its operations.

The use of non-contacting type measuring instruments, such as the stroboscope, obviate most of the disadvantages of contact-type measuring instruments. However, the stroboscope also has limitations. For example, since the stroboscope functions on the principle of synchronization, the speed of the rotating object has to be constant. Thus, the operator has to synchronize the rate of a light source which goes on and off with the speed of the rotating object so that the object appears to be stationary. If the speed of the rotating object is changing, it is very difficult for the operator to keep track of it. In addition, because of harmonic relationship, synchronization may appear to exist at any one of several viewing rates and erroneous measurements may result. Also, since reading has to be taken from a divided scale, error of interpretation and interpolation is very likely to occur.

Thus, since the principle of operation of the stroboscope requires that rapidity of motion be greater than the response time of the human eye, the stroboscope cannot be used for low speed applications.

A further limitation is that the stroboscope usually requires a line outlet to derive its power, and accordingly, the stroboscope is not truly portable and its use is limited to locations where a power outlet is available.

Other contactless rotating speed measuring devices, such as the types using a photocell, a source of light, a hybrid type of circuitry and a current driven meter, are generally unsuitable for measuring at very low or very high speeds. On low speeds, the needle of the meter vibrates because the power pulses that drive the meter are far apart from each other, and there is a limit in the damping circuitry used to alleviate the vibration problem. On high speeds, the operator has to read divided scales and make some interpretations or interpolation of the reading. Moreover, the metering device itself has a percent error associated with it, limiting the accuracy of the measurement.

Therefore, it would be desirable to have an instrument for measuring rotational speed or reciprocating motion which overcomes the limitations mentioned above.

SUMMARY OF THE INVENTION

It is therefore an object of the present invention to provide a new and improved non-contacting tachometer which provides an accurate reading of the rotational or reciprocating speed of an object over a wide range including very low speeds and very high speeds.

It is another object of the present invention to provide a tachometer for measuring the rotational or reciprocating speed of a variable speed device which automatically tracks and displays the speed of the device.

A further object of the present invention is to provide a tachometer which provides a direct digital readout of rotational or reciprocating speed measurements.

It is yet another object of the present invention to provide a new and improved non-contacting tachometer which is portable and of rugged construction.

These and other objects are achieved by the present invention which has provided a digital photo-optical tachometer apparatus for measuring the rotational or reciprocating speed of a device. The tachometer apparatus comprises a photo-sensor means which monitors the rotational or reciprocating speed of the device and provides a signal output of a frequency indicative of the speed of the device. A frequency detecting means is responsive to the signal output of the photo-sensor to provide a serial pulse train the frequency of which is related to the speed of the device. A time base generating means establishes a sampling rate of preset duration for sampling the pulse output of the frequency detecting means and for enabling an indicator means to provide a digital display indicating the measured speed.

In accordance with a disclosed embodiment, the frequency detecting means comprises a phase locked loop means connected for operation as a frequency multiplier circuit and which responds to the signal output of the sensor means to provide a series of output pulses, the frequency of which is an integral multiple of the input signal frequency. The indicator means includes a pulse accumulator means, and the serial pulse train provided by the phase locked loop means is gated to the pulse accumulator means, under the control of the time base generator means, to enable the pulse accumulator means to register a predetermined number of pulses within the preset time duration. The pulse accumulator means controls a suitable digital display means which is controlled by the pulse accumulator means to provide a digital display of the data after the pulse accumulator means is inhibited from receiving further pulses.

The use of the phase lock loop means as a frequency detector enables extremely accurate pulses to be counted and also provides an accurate representation of the input signal frequency.

The tachometer apparatus includes range switches which select the range of operation of the tachometer apparatus by adjusting the frequency of a reference signal of the phase locked loop means. Since the phase locked loop means is operable as a frequency multiplier the tachometer is capable of providing an accurate reading over a wide range from very low speeds to very high speeds.

Also, the provision of a sampling rate affords continuous measurement of the rotating object, and the measurement data displayed can be updated during each sampling period to permit tracking of variable speed devices.

Furthermore, the provision of a digital readout minimizes errors since human error in reading the different speed cannot occur because there are no divided scales to read from, and interpretation and interpolation are completely eliminated. The readout is digital in form, and no calculations are required.

In addition, the photo-optical tachometer apparatus of the present invention is a solid-state unit and employs integrated circuits. Accordingly, the instrument is rugged, and it is unlikely that damage will occur in normal usage because there are no tubes or meters to break or become misaligned. Also, due to the low power consumption of the of the tachometer apparatus, the instrument is portable and may be operated from a battery source if desired.

DESCCRIPTION OF THE DRAWINGS

FIG. 1 is a simplified representation of a digital photo-optical tachometer apparatus provided by the present invention.

FIG. 2 is a block diagram of the digital photo-optical tachometer apparatus shown in FIG. 1;

FIG. 3 is a block diagram of the phase locked loop of the tachometer apparatus shown in FIG. 2, and FIGS. 4 and 5, when arranged are side by side relationship showing a schematic circuit and partial block diagram of logic and display circuits of the tachometer apparatus shown in FIG. 2; and FIG. 6 shows relationships between the input signal and timing pulses employed in the tachometer apparatus.

DESCRIPTION OF A PREFERRED EMBODIMENT

Referring to FIG. 1, there is shown a simplified representation of a digital photo-optical tachometer apparatus 10 provided by the present invention for use in measuring the rotational or reciprocating speed of an object and for providing a digital readout of such measurement. By way of example, the apparatus 10 is shown employed in an application for measuring the speed of rotation of a shaft 13 of a motor 15.

The apparatus 10 includes an optical sensor probe 12, including a light source L1 and a photocell P1, and logic and display circuits 11. The light source L1 is energized over leads R and S from the logic and display circuits 11 to direct a beam of light towards the end 13' of the shaft 13 to be reflected back to the photocell P1 which, for example, may be a cadmium selenide photo conductive cell, commercially available as the Type CDS2000 from Pioneer Research. A narrow strip of reflective tape 27 disposed on the end 13' of the shaft 13, provides a contrast in reflectivity relative to the material of the shaft 13. The photocell P1 responds to the difference in reflected light as the shaft 13 rotates, to change in resistance for each revolution of the shaft 13. This resistance change develops a voltage between conductors T and S at the input of the logic and control circuits 11, which varies in frequency in accordance with the speed at which the shaft 13 is rotating.

GENERAL DESCRIPTION

Referring to FIG. 2, there is shown a block diagram of a digital photo-optical tachometer apparatus 10 showing the components of the logic and display circuits 11. The logic and display circuits 11 include an amplifier 14, a frequency detecting circuit 16, an indicator circuit 20, and a time base generating circuit 24.

The signal output of the sensor probe 12 is extended over the amplifier 14 to the frequency detecting circuit 16, which includes a phase locked loop 17 and a frequency divider circuit 18 which are connected for operation as a frequency multiplier circuit. The use of a phase locked loop 17, in accordance with the present invention, to detect the input signal provided by the sensor 12, provides an accurate number of pulses at a rate indicative of the frequency of the input signal. The phase locked loop 17 locks onto the input signals and provides a digital pulse train related in frequency to the input signal. The frequency divider circuit 18 controls the phase locked loop 17 to enable the serial pulse train to be of a frequency which is an integral multiple, thirty, in the disclosed embodiment, of the frequency of the input signal supplied over amplifier 14.

The output pulse train is extended to the indicator circuit 20, which includes a pulse accumulator circuit 21 and a digital display 22. The pulse accumulator circuit 21 registers the pulses supplied from the output of the phase locked loop 17 for a preset time. The time base generator 24, which includes a clock pulse generating circuit 25 and timing circuits 26, established the sampling period during which time the output of the phase locked loop 17 is extended to the input of the pulse accumulator circuit 21. In one example, the time base generating circuit 24 provides a timing pulse that is on for two seconds and off for 2 seconds.

Accordingly, the pulse accumulator circuit 21 receives and registers pulses for a 2 second period, the frequency of the pulses being 30 times that of the input signal frequency whereby the registered data represents the number of revolutions of the shaft 13 during a 1 minute period. After the preset 2 second duration established by the time base generator 24, the pulse accumulator circuit 21 provides control signals for the digital display 22 to provide a digital display of the number of pulses registered within the preset 2 second time interval and thus the RPM of the rotating shaft 13.

While phase locked loop circuits are known in the art, a brief description of the phase locked loop may be helpful to facilitate the understanding of the present invention. Referring to FIG. 3, the phase locked loop 17 includes a phase comparator 30, a low pass filter 31, an error amplifier 32, and a voltage controlled oscillator 33. The phase locked loop is basically a feedback system in which the error amplifier 32 is connected in the forward signal path and the voltage controlled oscillator 33 is connected in a feedback path between the error amplifier 32 and the phase comparator 30. In the exemplary embodiment, a divide by N circuit 34, which comprises the frequency divider circuit 18, is connected in the feedback loop between the voltage controlled oscillator 33 and the phase comparator 30.

The voltage controlled oscillator 33 operates at a preset frequency such that with no input signal applied to the input of the phase comparator 30, at point 16A, the error voltage at the input of the voltage controlled oscillator 33 at point 16D is equal to zero. When the input signal is applied to the input of the phase comparator 30 at point 16A, the phase comparator 30 compares the phase and frequency of the input signal with the output of the voltage controlled oscillator 33, as divided by the frequency divider circuit 34 (point 16F) and generates an error voltage at the output of the phase comparator 30 at point 16B that is related to the phase and frequency difference between the two signals.

The presence of the frequency divider circuit 34 in the feedback loop causes the voltage controlled oscillator 33 to operate at a multiple of the input frequency, 30 in the illustrative embodiment.

The use of the frequency divider circuit 34 in the feedback loop enables the input signal to vary over a wide frequency range. Thus, the tachometer apparatus 10 as provided by the present invention, can be used to measure the speed of variable speed devices. Also, the frequency multiplication effected through the use of the frequency divider circuit 34 permits the measurement of very low frequencies with a high degree of accuracy, and permits the use of an inexpensive crystal oscillator for the clock 25 to provide the 2 second sample rate and to enable measurement data to be displayed at low rates.

The error voltage is filtered and amplified and applied to the control input of the voltage controlled oscillator at point 16D, causing the voltage controlled oscillator frequency to vary in a direction that reduces the frequency difference between the output of the voltage controlled oscillator 33 and the input signals. If the frequency of the input signal is sufficiently close to the frequency of the voltage controlled oscillator 33, as divided by the frequency divider 34, the feedback action of the voltage controlled oscillator circuit 33 causes the signal output of the voltage control oscillator 33 to be synchronized or "locked" with the input signal, such that the output of the voltage controlled oscillator 33 at point 16E is identical with the harmonic of the input signal except for a finite phase difference which is required to generate the corrective error signal to maintain the voltage controlled oscillator frequency shifted a predetermined amount from the free-running value to the input signal frequency.

DETAILED DESCRIPTION

FIGS. 4 and 5, when arranged in a side by side relationship show a schematic circuit and partial block diagram of the logic and display circuits 11, shown in FIG. 2. Referring to FIG. 4, the logic and display circuits 11 include a power supply 40 which includes a pair of rechargeable batteries 41 and 42 which supply +6 volts and —6 volts dc and a ground reference to the circuits 11 whenever a power switch 43 is operated. The power supply 40 also includes a recharging circuit 44 connectable to a 120VAC source to permit recharging of the batteries 41 and 42.

The sensor probe 12 is connectable to the input of the logic and display circuits 11 at the input of the amplifier 14 by way of a suitable plug-connector assembly 45, which, for example, may include a telephone type plug 45a and a jack 45b having a tip contact T connected to the input of the amplifier at point 46, a ring contact R connected over a resistor R29 to —6v, and a sleeve contact S connected to ground. Accordingly, when the sensor probe 12, (FIG. 2) is plugged into the logic and display circuits 11, the light source L1 is connected between —6v and ground, and the photocell P1 is connected between point 46 and ground to extend the voltage output of the sensor probe 12 to the input of the amplifier 14.

The amplifier 14 is a conventional voltage amplifier comprising a transistor Q13 and associated bias elements including resistors R23 and R28 and capacitors C11 and C12. The voltage input from sensor probe 12 at point 46 is coupled over capacitor C12 and resistors R25 and R24 to the base of transistor Q13, which amplifies the input signal and provides an output at the collector of transistor Q13, which is coupled over a capacitor C10 to an input of the phase lock loop circuit 17 of the frequency detecting circuit 16 at point 48, FIG. 5.

The phase lock loop circuit 17 may for example comprise a phase locked loop 50, such as the Type NE565, commercially available from Signetics.

The phase locked loop 50, hereinafter referred to as PLL-50, has an input at pin 2 connected to the output of the amplifier 14 at point 48, and over a resistor R21 to ground. A further input at pin 3 is connected over a resistor R22 to ground. Power at levels +6v and —6v is supplied to pins 10 and 1, respectively. A low pass filter capacitor C8 is connected between pins 7 and 10, and a capacitor C9 is connected between pins 7 and 8 to eliminate undesired oscillations.

The free-running frequency of the voltage controlled oscillator (FIG. 3) is selected by way of a range network 54, of the tachometer apparatus 10, shown in FIG. 4, which connects a resistance of a preselected value to pin 8 of PLL-50 and a capacitance of a preselected value to pin 9 of PLL-50.

Referring to FIG. 4, the range switch 54 comprises four double pull-double throw switches 54-A to 54-D, which permit selection of a plurality of operating ranges for the tachometer apparatus 10 to permit measurement of a wide range of speeds for rotating objects, such as shaft 13 of the motor 15 (FIG. 1). For example, switchs 54-A to 54-D are selectively operable to provide six ranges of operation summarized in Table I.

TABLE I

| Range (RPM) | RANGE SWITCH | | | 54-D (Switch) |
|---|---|---|---|---|
| | 54-A | 54-B | 54-C | |
| 150–300 | IN | IN | OUT | OUT |
| 300–600 | IN | IN | IN | OUT |
| 600–1200 | IN | IN | IN | IN |
| 1200–2400 | OUT | IN | OUT | OUT |
| 2400–4800 | OUT | IN | IN | OUT |
| 4800–9600 | OUT | IN | IN | IN |

Switch 54-A controls the switching of either capacitor C13 or C14 to input 9 of PLL-50. Switches 54B, 54C and 54D control the switching of resistors R30, R31, and R32, respectively, to input pin 8 of PLL-50. The selected resistors R30–R32 and capacitors C13–C14 determine the free-running frequency for the voltage controlled oscillator 33 of the phase lock loop circuit 17.

The range switch 54 is shown in a position to provide a measuring range of 300–600 RPM for the tachometer apparatus 10. In such position, switch 54-A connects capacitor C13 to pin 9 of PLL-50 and switch 54C connects resistor R31 to pin 8 of PLL-50. The voltage controlled oscillator 33 is set to a frequency of 5 pulses per second which output occurs at pin 4 of PLL-50. In view of the frequency multiplication referred to above, the pulse output rate of PLL-50 is 150 pulses per second which, when sampled for 2 seconds, is equivalant to a 300 RPM measurement.

Referring to FIG. 5, the output of PLL-50 at pin 4 is extended over resistor R20 to the base of a driver transistor Q12 which has an emitter connected to ground and a collector connected over resistor R19 to +6v and to an input of the frequency divider circuit 18 at point 56.

The frequency divider circuit 18 comprises a three stage counter including counter states 57, 58, and 59, which divide the input frequency by 30 and supply the divided frequency to the input of the voltage controlled oscillator 33 at pin 5 of PLL-50. The input stage 60 of the frequency divider circuit 18 comprises two identical JK flip flops, such as the types SN7473, connected in tandem and operable to provide a divide by three function. Counter stage 59, which may comprise a Signetics Type N8280 Decade counter, having a 50 percent duty cycle, provides a divide by 10 function. The output of the decade counter 59 at pin 5 is connected to the input of the voltage controlled oscillator 33 at pin 5 of PLL-50. Accordingly, the incoming signal appears to have a frequency of 30 times the actual frequency. Since the output at pin 4 is equal to the input signal frequency, when the frequency of the voltage controlled oscillator 33 is locked to the input frequency, the frequency of the signal appearing at pin 4 of the PLL-50 is (exactly) 30 times the actual frequency of the input signal at pin 2 of PLL-50. The signal output of the phase locked loop circuit 17 is extended to the indicator circuits 20 under the control of the time base generating circuit 24.

Referring to FIG. 5, the pulse accumulator circuit 21 of the indicator circuits 20 may, for example, be a Digit Counter/Display Decoder 100, such as the Type MK5005P, commercially available from MOSTEK Corporation of Carrollton, Tex. The decoder circuit 100 responds to serial input data gated thereto over the timing circuits 26 from the phase locked loop 17 during the 2 second sampling period established by the time base generating circuits 24 to provide drive signals for the digital display 22. The digital display circuit 22 is embodied as a four digit light emitting diode display having four segmented light emitting diodes DS1-DS4, each of which has seven segments A-G. The diode display may, for example, be the Type FND 70 commercially available from Fairchild Semiconductor.

The decoder 100 is basically a four decade synchronous counter having counter decade stages 101-104 and associated latch circuits 105-108, a multiplexing circuit 110 and a read only memory 111. The decade counters 101-104 are synchronously incremented on the negative edge of the pulses supplied to the count input $\bar{C}$ from the phase locked loop 17. In response to a transfer signal provided by the timing circuits 26 to a transfer input $\bar{T}$ of the decoder 100, the data in the decade counters 101-104 is transferred to the static storage latches 105-108. The timing circuit 26 thereafter supplies a reset signal over reset input $\bar{R}$ of the decoder 100 to reset the counters 101-104 after the data has been transferred to the latches 105-108.

The data in the latch circuits 105-108 is transferred to the read only memory 111 over the multiplexer circuit 110 under the control of a digit select counter and decoder 109. The digit select counter 109 has a scan rate, such as 180Hz, established by a capacitor C1 which is connected to a scan input S of the decoder circuit 100. The counter 109 provides a one-out-of four output to the multiplexer 110 for scanning from most significant digit to least significant digit, enabling the outputs of the latch circuits 105-108 to be decoded into seven segment output form as extended to the read only memory 111, and for enabling the corresponding digit select output MSD, 2nd, 3rd, and LSD.

The decoder 100 further includes an over-flow latch circuit 113 which provides a control input for blanking control circuits 114 to force the seven-segment output to the off state to inhibit the display 22 in the event of an over-flow condition for the counters 101-104.

The read only memory 111 provides seven segment outputs A-G which are extended over suitable buffer and gating circuits 115 of the decoder 100 and driver circuits 114 to the light emitting display devices DS1-DS4 each of which is capable of displaying any digit from 0-9.

The scan rate of the decoder 100, approximately 180 Hz, permits scanning of the light emitting diodes DS1-DS4 so that each diode is energized for only 5 milliseconds. However, because of the relatively slow rate of the clock, it appears to the eye that the diodes DS1-DS4 are continuously energized.

Driver circuits 116, which extend the digit select signals to the display devices DS1-DS4, may include four Darlington connected transistor pairs providing separate signal paths for the four digit select signals. Driver circuits 117 may include seven transistors, each interposed between a different one of the segment outputs of the decoder 100 and the corresponding segment inputs of each of the display devices DS1-DS4.

The time base generating circuit 24, including the clock pulse generating circuit 25 and the timing circuit 26, shown in FIG. 4, provides the 2 second sampling period during which time the signal output of the phase locked loop 17 is gated to the decoder circuit 100. In addition, the timing circuits 26 provide transfer and reset inputs for the decoder circuit 100.

The clock pulse generating circuit 25 comprises a crystal oscillator 66 and a 24-stage counter 67, which may be the Type MC14521CP, commercially available from Motorola. The crystal oscillator 66 comprises a crystal CR1, the natural frequency of which may, for example, be 2.097152 MHZ, and resistors R14-R15 and capacitors C6-C7 which are connected between pins 6 and 4 of the counter 67, to enable the clock pulse generator circuit 25 to provide a signal at frequency of 2.097152 MHZ which is counted down by the counter 67 to provide a precise 2 second on, 2 second off signal at output pin 15, which defines the sampling time for the logic and display circuits 11.

The timing circuits 26 include gating circuits 26a which are interposed between the output of the frequency detecting circuit 16 at point 58 and the count input $\bar{C}$ of the decoder circuit 100. The timing circuits 26 further include four tandem connected gating circuits 26b-26e which respond to the trailing edge of 2 second sampling signal provided by the clock pulse generating circuit 25 to control the transfer and reset functions of the decoder circuit 100 at the start of the two second interval following the sampling signal.

The output of the frequency detecting circuit 16 at point 56 is connected over a conductor 62 to a first input 63 of a NAND gate 64 of gating circuit 26a. A second input 65 of gate 64 is connected to the output of the counter 67 of the clock pulse generating circuit 25 permitting gate 64 to follow the signal output of the phase locked loop 17 during the 2 second sampling period. The output of gate 64 is connected to an input 73 of a NAND gate 68 of gating circuit 26a the output of which is connected over an inverter 69 to the count input $\bar{C}$ of the decoder circuit 100. A second input 88 of gate 68 is connected to an output of an inverter 83 of gating circuit 26d which normally provides an enabling signal for gate 68. Accordingly, when gates 64 and 68 are enabled, the signal output of the phase locked loop 17 is extended to the count input $\bar{C}$ of the decoder circuit 100.

The transfer input for the decoder circuit 100 is provided by gating circuit 26b, which includes a NAND gate 71, an inverter 72 and a capacitor C5 connected between the output of gate 71 and the input of inverter 72, which are connected for operation as an edge detector. Gate 71, which has an input 70 connected to the output of counter 67, responds to the trailing edge of the 2 second sampling pulse to provide a pulse output over capacitor C5, which is inverted by inverter 72 and extended to the transfer input $\bar{T}$ of the decoder 100, such pulse also being fed back as an inhibit signal to a second input 74 of gate 71.

The pulse output of gating circuit 26b is also extended to an input 75 of gating circuit 26c, which is the logic complement of gating circuit 26b and which responds to the pulse output to provide a further pulse output for gating circuit 26d. Gating circuit 26c includes a NOR gate 72 having an input 75 connected to the output of inverter 72, and an output connected over a capacitor C4 to an input of an inverter 78 the output of which is connected to an input 80 of a NAND gate 81 of gating circuit 26d. Gate 76 responds to the trailing edge of the pulse provided by gating circuit 26b to provide a pulse over capacitor C4 which is inverted by inverter 78 and extended to the input 80 of gate 81, such pulse also being fed back as an inhibit signal to a second input 79 of gate 76.

Gating circuit 26d is similar to gating circuit 26b and includes gate 81, an inverter 83 and a capacitor C3 which is connected between an output of gate 81 and an input of inverter 83, the output of which is connected to input 88 of gate 68 and to an input 85 of a NOR gate 86 of gating circuit 26e. As indicated above, the output of inverter 83 normally enables gate 68. In response to the trailing edge of the pulse provided by gating circuit 26c, gate 81 is enabled to provide a pulse over capacitor C3 which is inverted by inverter 83 and extended to input 88 of gate 68, disabling gate 68, and to input 85 of gate 86. The pulse output is also extended as an inhibit signal to an input 84 of gate 81.

Gating circuit 26e is similar to gating circuit 26c and includes gate 86, a capacitor C2 and inverters 92 and 94. The output of gate 86 is connected over capacitor C2 to an input of inverter 92, the output of which is connected over conductor 93 to a reset input of the counter 67 of the clock pulse generating circuit 25, and to an input of inverter 94. The output of inverter 94 is connected to the reset input $\bar{R}$ of the decoder circuit 100.

Gate 86 responds to the trailing edge of the pulse provided by gating circuit 26d to provide a pulse over capacitor C2 which is inverted by inverter 92 and extended over conductor 93 to effect reset of counter 67, the pulse output of inverter 92 also being fed back as an input signal to an input of gate 86 and over inverter 94 and conductor 95 to effect reset of counters 101–104 of the decoder 100.

It is pointed out, the propagation delays provided by gating circuits 26c–26e provide the desired delay between the generation of the transfer pulse and the reset pulse for the decoder 100.

The timing circuits 26 further include a flip flop 72' for enabling inhibit of the digit display in the event of an overflow condition for the counters 101–104 of the decoder 100. The flip flop 72' may, for example, be the Type CD4013AE, commercially available from RCA. Flip Flop 72' has a data input connected to an overflow latch output $\overline{OL}$ of the decoder 100. A clock input C of the flip flop 72' is connected in common with the transfer lead to the output of inverter 72 of gating circuit 26b. The "false" output $\bar{Q}$ is connected over an inverter 98 to a blanking input $\bar{B}$ of the decoder 100. The overflow latch output $\overline{OL}$ is normally at logic 1 level and thus, the flip flop 72' is normally set whereby the blanking input B is maintained at a logic level to inhibit the blanking control circuits 114. In the event of an overflow condition, flip flop 72' is reset when the next transfer pulse is provided thereby enabling the blanking control circuits 114 to inhibit display of the data registered by the decoder 100.

OPERATION

Referring again to FIG. 1, for the purpose of illustrating the operation of the digital photo-optical tachometer apparatus 10, it is assumed the shaft 13 is rotating at a speed of 360 RPM which corresponds to 6 revolutions per second. Accordingly, the resistance of the photocell P1 of the sensor probe 12 changes at the rate of 6 times per second, producing a signal having a frequency of 6 cycles per second.

Referring to FIG. 4, the input signal as amplified over amplifier 14 is coupled to the input of the phase locked loop 50 at pin 2 thereof. Assuming that the range select switch 54 is set as shown in FIG. 4 to measure over the range of 300 to 600 RPM then the voltage controlled oscillator 33 (FIG. 3) is set to run at approximately 5 pulses per second, which is equivalent to 300 RPM. The phase detector 30 of the phase locked loop 50 detects this difference and automatically adjusts the frequency of the voltage controlled oscillator 33 to coincide with the frequency of the input signal. In view of the frequency multiplication effected by the use of the frequency divider circuit 18, the input signal appears to have a frequency of 6 cycles per second times 30, or 180 cycles per second. Accordingly, the phase locked loop 17 provides a pulse train output at a repetition rate of 180 pulses per second.

The pulse train output of the phase locked loop 17 is extended over gate 64, when enabled by the 2 second timing pulse provided by clock pulse generating circuit 25, and over gate 68 to the count input C of the decoder 100. In the present illustration, 180 pulses per second enter the decoder 100 and since the time base generator 24 allows the decoder 100 to accept pulses for 2 seconds, 360 pulses are counted by the counters 101–104 of the decoder 100 during each sampling period. At the end of the 2 second sampling period, gating circuit 26b provides a transfer pulse to transfer input T to enable the count to be transferred to the read only memory 111 which provides the seven segment outputs, which together with the four digit select outputs MSD, 2nd, 3rd, LSD enable the digital display devices DS1–DS4 to provide a readout representing the number of pulses which have been counted, 360 in the example, and such number, which is the exact equivalent of the 360 RPM of the shaft 13. Since the light emitting diode displays DS1–DS4 are supplied with new information every 2 seconds, then, should the speed of the shaft 13 change, such change is tracked and automatically displayed.

After the propagation delays provided by gating circuits 26c–26e, the reset signal is provided to reset the counters 101–104 of the decoder which are then prepared to count a further series of pulses during the next sampling period.

It is pointed out that the clock pulse generating circuit 25 is not synchronized with the incoming signal. That is, the 2 second standard in the counter 67 of the clock pulse generating circuit 25 is started randomly with respect to the input signal. Thus, the first read out displayed may be incorrect because the input signal probably was not counted for the full 2 seconds. However, subsequent readouts would be correct to within ± 1 RPM.

Referring to FIG. 6, if the clock pulse generating circuit 25 starts as shown at line B, relative to the input signal, shown in line A, the counters of the pulse accumulator circuit 21 counts 10 pulses in that 2 second period. If the clock pulse generating circuit 25 starts as shown at line C, relative to the input signal, shown in line A, the pulse accumulator circuit 21 counts 11 pulses in that 2 second period. Hence it is easily seen that the digital tachometer 10 is accurate to within ± 1 pulse, in this case ± 1 RPM. This error is always in the least significant digit, for any range of operation of the apparatus 10. While the exemplary range is 150–9600 RPM, the above-noted accuracy is maintained for all ranges from very low to very high RPM, on the order of 16,000 RPM, for example. While the accuracy is dependent upon the accuracy of time base generator 24, the time base generator 24 comprises a crystal controlled clock 25, the stability of which is extremely high, and thus, the error associated with it can be safely neglected.

We claim:

1. In a tachometer for measuring the rotational or reciprocating speed of a moving object, the combination comprising sensing means for deriving an input signal related in frequency to the speed of the object, frequency detecting means including phase comparator means for comparing said input signal with a reference signal of a predetermined frequency and for providing a series of output pulses having a frequency which is an integral multiple of the frequency of the input signal, timing means, and output means controlled by said timing means to be responsive to the number of output pulses provided within a predetermined time duration to provide an indication of the speed of said object.

2. A tachometer as set forth in claim 1 which includes range select means for selecting the reference signal to thereby permit the determination of the rotational speed of said rotating object to be measured over a predetermined number of ranges.

3. In a tachometer for measuring the rotational or reciprocating speed of a moving object, the combination comprising sensing means for deriving an input signal related in frequency to the speed of the object, frequency detecting means including phase comparator means for comparing said input signal with a reference signal of a predetermined frequency, said phase comparator means including a phase locked loop means having an input connected to said sensing means to receive said input signal and to be responsive to said input signal to provide a series of output pulses, the frequency of which is related to the frequency of the input signal, timing means, and output means controlled by said timing means to be responsive to the number of pulses provided within a predetermined time duration to provide an indication of the speed of said object, said phase locked loop means having an output connected over said timing means to said output means, to permit said pulses to be supplied to said output means under the control of said timing means.

4. A tachometer as set forth in claim 3 wherein said phase locked loop means includes frequency divider means for controlling said phase locked loop means to provide a serial pulse train output, the period of which is an integral multiple of the input signal as determined by said frequency divider means.

5. A tachometer as set forth in claim 4 wherein said phase locked loop means includes reference means for providing said reference signal, and range select means for enabling said reference means to provide a reference signal of a different predetermined frequency for each of a predetermined number of ranges to thereby permit the determination of the rotational speed of said rotating object to be measured over said predetermined number of ranges.

6. A tachometer as set forth in claim 4 wherein said output means includes pulse accumulator means operable to store each pulse extended thereto during said predetermined time, said timing means including means for preventing pulses from being extended to said pulse accumulator means during a second predetermined time duration following said first predetermined time duration.

7. A tachometer as set forth in claim 6 wherein said output means further includes indicator means comprising a digital means, said pulse accumulator means providing digital coded output signals to said digital display means to effect the display of data representing the rotational speed of said object during said second predetermined time duration.

8. In a tachometer for measuring the rotational or reciprocating speed of a moving object, the combination comprising sensing means including a photooptical sensor having a light source means and a light detecting means for deriving an input signal related in frequency to the speed of the object, frequency detecting means including phase comparator means for comparing said input signal with a reference signal of a predetermined frequency and for providing a series of output pulses the frequency of which is related to the frequency of the input signal, timing means, and output means controlled by said timing means, to be responsive to the number of pulses provided within a predetermined time duration to provide an indication of the speed of said object.

9. In a tachometer for measuring the rotational or reciprocating speed of a moving object, the combination comprising photo-optical sensing means for providing an input signal related in frequency to the speed of the object, frequency detecting means including a phase locked loop means including means for providing a reference signal of a predetermined frequency and means for comparing said reference signal with said input signal, said phase locked loop means being operable to provide a series of pulses, the period of which is related to the frequency of the input signal, pulse accumulator means, timing means for enabling said pulses to be extended to said pulse accumulator means, said pulse accumulator means including means for registering the pulses extended thereto, said timing means including clock pulse generating means for establishing a first time period of a preset duration during which said pulses are extended to said pulse accumulator means and a second time period of a preset duration, following said first time period, during which pulses are prevented from being extended to said pulse accumulator means whereby the number of pulses registered by said pulse accumulator means represents the speed of said object, and indicator means controlled by said pulse accumulator means to provide a display of numerical data indicative of the speed of said object.

10. A tachometer as set forth in claim 9 wherein said frequency detecting means includes frequency divider means for controlling said phase locked loop means to provide a serial pulse train the frequency of which is a preset integral multiple of the frequency of the input signal.

11. A tachometer as set forth in claim 9 wherein said timing means further includes gating means interposed between an output of said phase locked loop means and an input of said pulse accumulator means, and operable when enabled to extend said pulses to said pulse accumulator means, said clock pulse generating means operable to provide a first timing signal of said preset duration for enabling said gating means for said first time period and operable to provide a second timing signal of said preset duration for disabling said gating means for said second time period.

12. A tachometer as set forth in claim 11 wherein said clock pulse generating means includes oscillator means for providing a signal of a predetermined frequency, and frequency counting means responsive to said frequency signal to provide said first and second timing signals.

13. A tachometer as set forth in claim 12 wherein said gating means includes means for providing a reset signal for said frequency counting means after said first predetermined period to enable said frequency counting means to provide said second timing signal.

14. A tachometer as set forth in claim 12 wherein said oscillator means comprises a crystal oscillator.

15. A tachometer as set forth in claim 9 wherein said indicator means comprises a plurality of segmented light emitting diode display means each individually controlled by said pulse accumulator means to provide a digital display of said numerical data.

* * * * *